Feb. 14, 1967 S. ROBERTS 3,304,048
BALANCED VALVE
Filed Oct. 14, 1963 3 Sheets-Sheet 1
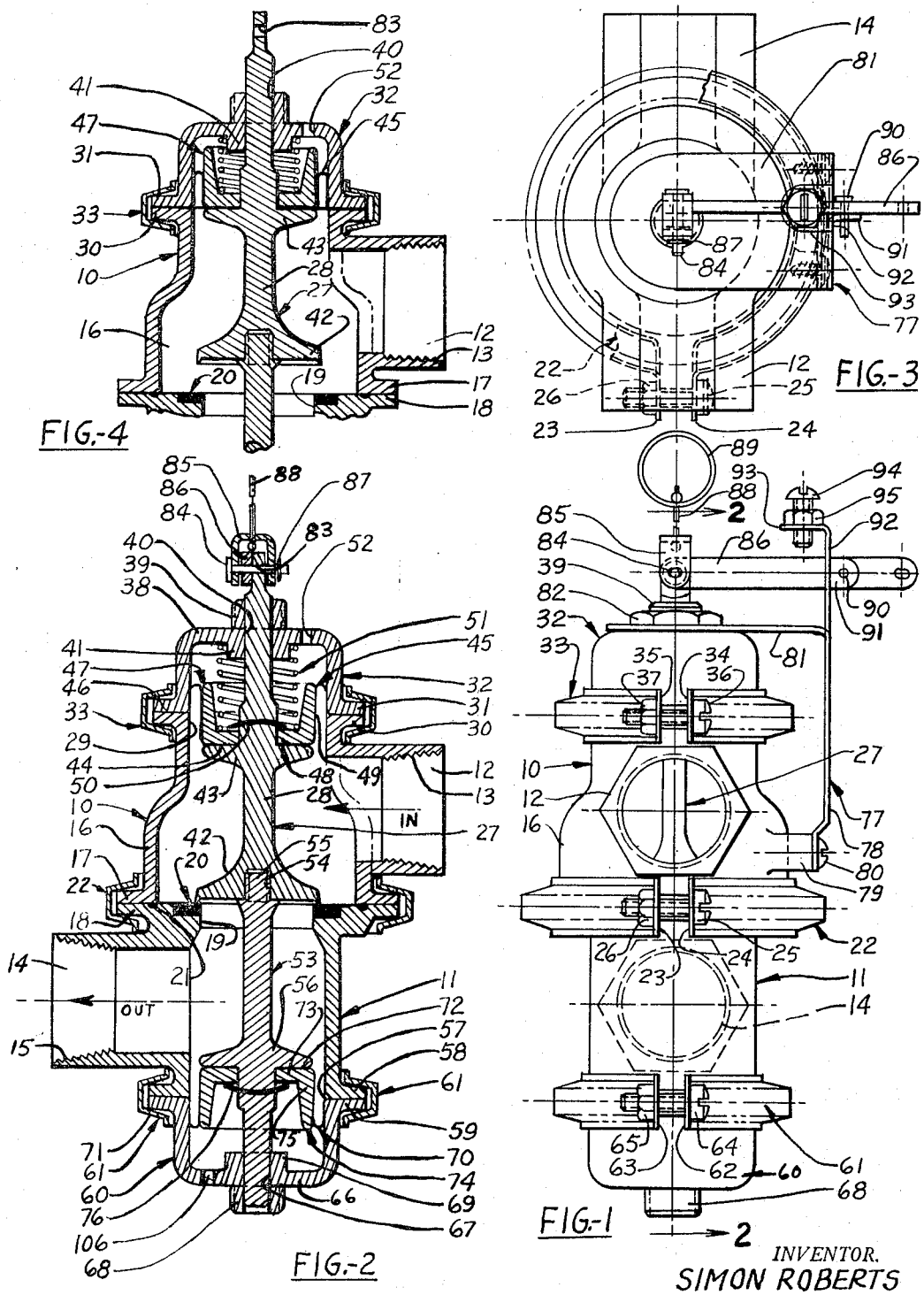
INVENTOR.
SIMON ROBERTS
BY
Donnelly, Mentag & Harrington
ATTORNEYS

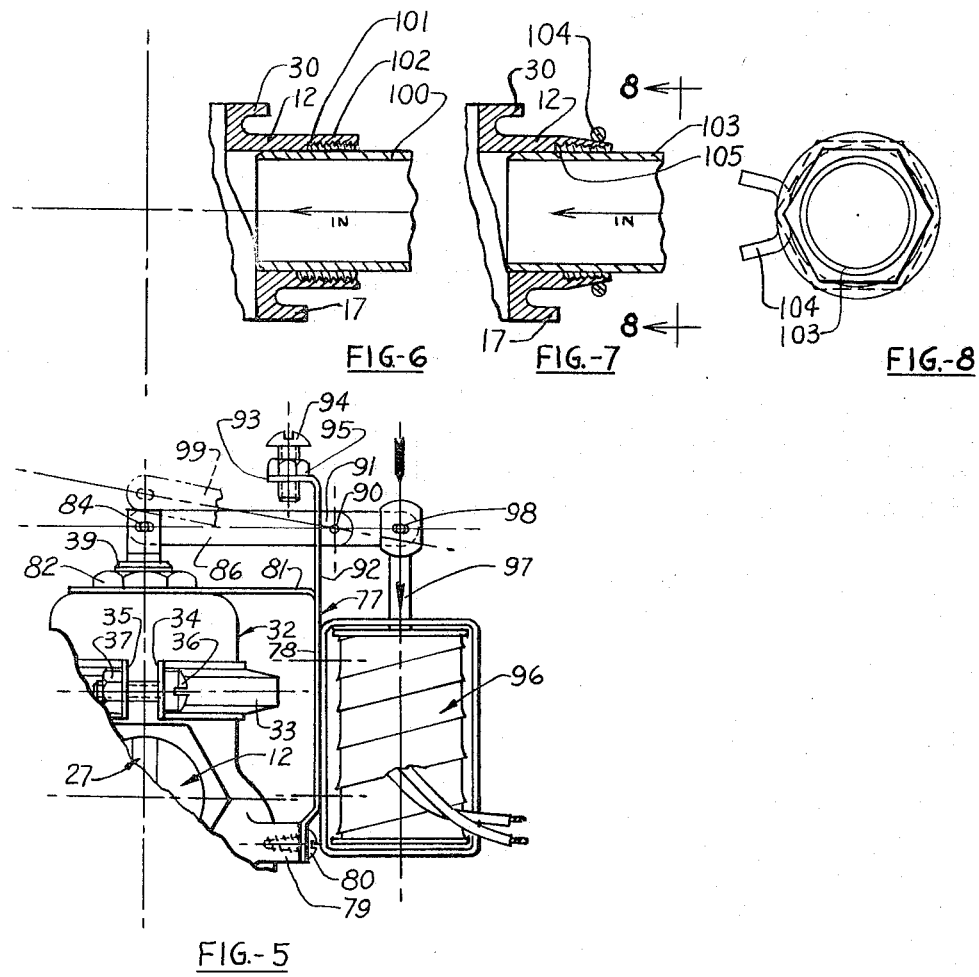

Feb. 14, 1967 S. ROBERTS 3,304,048
BALANCED VALVE
Filed Oct. 14, 1963 3 Sheets-Sheet 3
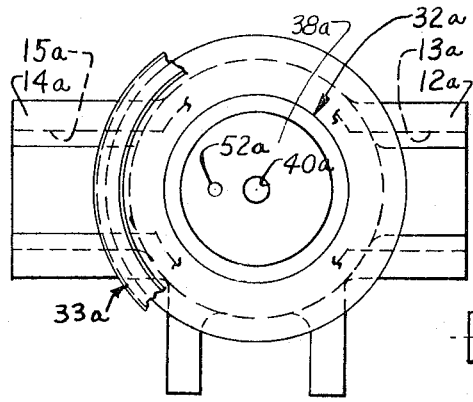
FIG.-11
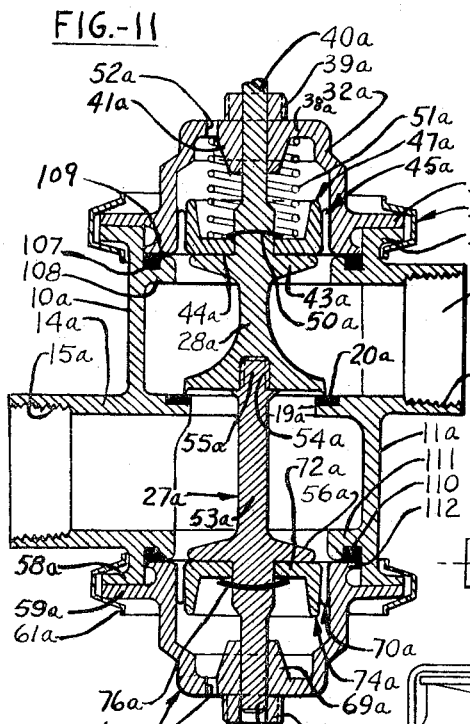
FIG.-10
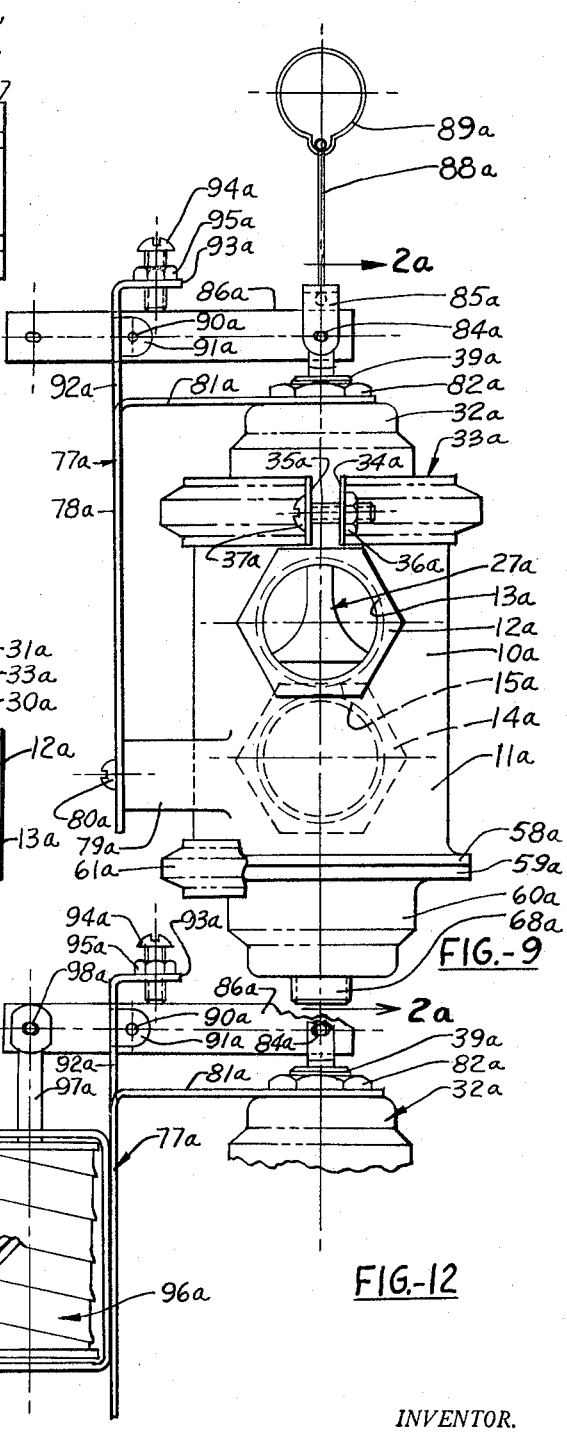
FIG.-9
FIG.-12
INVENTOR.
SIMON ROBERTS
BY Donnelly, Mentag & Harrington
ATTORNEYS United States Patent Office 3,304,048
Patented Feb. 14, 1967

3,304,048
BALANCED VALVE
Simon Roberts, 20177 McIntyre, Detroit, Mich. 48219
Filed Oct. 14, 1963, Ser. No. 315,985
9 Claims. (Cl. 251—138)

This invention relates generally to balanced pressure fluid flow control valves, and more particularly to a valve of this type which is constructed so that it will open and close at virtually the same operating force for any pressure encountered by the valve in the normal range of working pressures.

In the past, solenoid operated pressure valves have been provided with straight or flat diaphragms in an attempt to provide a balanced fluid flow control valve. In such valves, the flat diaphragm's effective cross section changes throughout the valve stroke and there is a constantly changing effective operating area which must be controlled by various means and which adds complexity and friction to the valve structure. A valve of the prior art type employing such a flat diaphragm is shown in U.S. Patent 2,602,627, and the structure of the valve in that patent makes it necessary to use a piston with the diaphragm to provide the effective area and different size clamping washers to provide directional unbalance which is required in a valve of that type to help seal against high pressures.

Accordingly, it is the primary object of the present invention to provide a balanced pressure fluid flow control valve which includes an outlet housing, an inlet housing mounted in vertical alignment on the outlet housing, and a valve and stem assembly operatively mounted in said housings with a valve element mounted on the stem, and wherein the valve and stem assembly is provided at each end thereof with a rolling diaphragm, and the rolling diaphragms are equal in effective operating areas relative to each other and to the valve element. The effective operating areas of the rolling diaphragms remain constant throughout the entire operating range of the valve. The valve and the stem assembly is spring biased downwardly to the normal closed position and because of the low inherent friction of the rolling diaphragms, there is virtually no additional force required to operate the valve other than the pressure of the spring. The seating force of the spring is just strong enough to seat the valve and seal it against leakage. The valve is balanced in the open and closed positions but it temporarily unbalanced at the instant of closure. The temporary unbalance and the venturi action at the instant of closure coact with the valve seating spring in seating the valve in the closed position.

It is another object of the present invention to provide a fully balanced pressure fluid flow control valve which is stable in operation regardless of the pressure of the fluid, and which is adapted to close under the same light spring pressure at all operating pressures, and wherein the work required to unseat the valve is a minimum.

It is still another object of the present invention to provide a balanced pressure fluid flow control valve which includes an inlet and outlet housing and wherein said housings may be disposed in any radially adjusted position to provide universal adjustability of the inlet and outlet housings relative to each other, and wherein said housings are adapted to be releasably clamped together in a desired position.

It is a further object of the present invention to provide a balanced pressure fluid flow control valve which may be operated manually, or by electrical solenoid means.

It is still a further object of the present invention to provide a balanced pressure fluid flow control valve which is provided with means for adjusting the flow through the valve and wherein said valve may be provided with means for quickly and easily attaching unthreaded inlet or outlet copper or plastic pipes.

Other objects, features and advantages of this invention will be apparent from the following detailed description, appended claims, and the accompanying drawings.

In the drawings:

FIG. 1 is a side elevational view of a balanced pressure valve made in accordance with the principles of the present invention, and showing means for manually operating the valve;

FIG. 2 is an elevational sectional view of the structure illustrated in FIG. 1, taken along the line 2—2 thereof, looking in the direction of the arrows, and showing the valve in a closed position;

FIG. 3 is a top plan view of the valve structure illustrated in FIG. 1;

FIG. 4 is a fragmentary, elevational sectional view of the valve structure of FIG. 1, with parts removed, and showing the valve in the open position;

FIG. 5 is a fragmentary view of the upper end of the valve shown in FIG. 1, and showing an electric solenoid means for operating the valve instead of the manual operation means shown in FIG. 1;

FIG. 6 is a fragmentary, elevational sectional view of a modified form of the valve inlet housing inlet tube provided with an O-ring sealing means and cement for attaching unthreaded copper or plastic pipes to the valve;

FIG. 7 is a fragmentary, elevational sectional view of another modified form of the valve inlet housing inlet tube, showing a second means for attaching unthreaded copper or plastic pipes to the valve, and which includes the use of an O-ring sealing means and a clamp;

FIG. 8 is a front elevational view of the structure illustrated in FIG. 7, taken along the line 8—8 thereof and looking in the direction of the arrows;

FIG. 9 is a side elevational view of a second valve embodiment made in accordance with the principles of the present invention;

FIG. 10 is an elevational sectional view, with parts removed, of the structure illustrated in FIG. 9, taken along the line 10—10 thereof, and looking in the direction of the arrows;

FIG. 11 is a top plan view of the valve structure illustrated in FIG. 9 and with parts removed; and, FIG. 12 is a fragmentary elevational view of the upper end of the valve shown in FIG. 9, and illustrating an electric solenoid for operating the valve instead of the manual operation means shown in FIG. 9.

Referring now to the drawings and in particular to FIGS. 1 through 4, wherein is shown a first embodiment of the invention, the numeral 10 generally designates the upper or inlet housing which is adjustably mounted on the lower or outlet housing, generally indicated by the numeral 11. As shown in FIGS. 2 and 4, the inlet housing 10 is provided at the upper end thereof with a horizontally disposed inlet tube 12 which is threaded, as indicated by the numeral 13, for threaded engagement with an inlet pipe in a fluid pressure system. The outlet housing 11 is provided at the lower end thereof with the horizontal outlet tube 14 which is threaded, as indicated by the numeral 15, for threadably mounting the outlet tube 14 in a fluid pressure system.

The lower end 16 of the inlet housing is enlarged so as to reduce the pressure loss in the inlet housing by allowing a large flow cross-section when the valve is in the open position. The inlet housing 10 is open at its lower end and formed around this opening is the outwardly extended, horizontal clamping flange 17 which is seated on the mating outwardly extended horizontal clamping flange 18 formed on the open upper end of the outlet housing 11. The numeral 19 in FIGS. 2 and 4 indicates the entrance opening to the outlet housing 11 for communicating the same with the interior of the inlet housing 10. Seated around the entrance opening 19 in a suitable groove is a valve seat 20 which is made from any suitable resilient material as rubber, cork or the like but may be a machined seat. A suitable O-ring sealing means 21 is mounted between the flanges 17 and 18 or a modified extension of valve seat 20 as shown in FIGS. 2 and 4. As shown in FIGS. 1, 2 and 3, the clamping flanges 17 and 18 are releasably secured together by means of the substantially V-shaped clamping ring generally indicated by the numeral 22. The clamping ring 22 is substantially circular and is provided with the ends 23 and 24 which are secured together by means of the bolt 25 and the nut 26. It will be seen that when the clamping ring 22 is loosened, the inlet housing 10 may be adjusted radially relative to the outlet housing 11 so as to dispose the inlet tube 12 at any desired adjusted position relative to the outlet tube 14.

As shown in FIGS. 2 and 4, the valve of the present invention includes a vertically movable valve and stem assembly generally indicated by the numeral 27. The upper end or inlet part of the valve and stem assembly includes the upper stem portion 28 which extends upwardly out through the open upper end 29 of the inlet housing 10. The inlet housing 10 is provided with an outwardly extended horizontal clamping flange 30 around the upper end thereof which is adapted to have seated thereon the mating clamping flange 31 carried on the open lower end of the inlet housing cap or cover generally indicated by the numeral 32. The clamping flanges 30 and 31 are releasably secured together by means of a clamping ring, generally indicated by the numeral 33, which is similar to the clamping ring 22. The clamping ring 33 is provided with the ends 34 and 35 which are secured together in clamping relationship by means of the bolt 36 and the nut 37 or conventional bayonet type joint structure adapted to provide a wedging action to compress the resilient material at the joint.

The inlet housing cap or cover 32 is provided with the upper end wall 38 on which is formed the hub 39. A bore 40 is formed through the cap end wall 38 and the hub 39 and slidably mounted through the bore 40 is the upper end of the valve stem portion 28. An inwardly extended boss 41 is formed around the bore 40 on the inner surface of the end cap wall 38.

As shown in FIGS. 2 and 4, a circular valve element 42 is formed on the lower end of the valve stem upper portion 28 for operative engagement with the valve seat 20 when the valve assembly is in the closed position as shown in FIG. 2. Spaced upwardly from the valve element 42 is a diphragm support member 43 which is annularly shaped and integrally formed on the valve stem portion 28. It will be understood that the diaphragm support member 43 may be separately formed and mounted on the valve stem portion 28. The upper side of the diaphragm support 43 is flat and seated on this flat surface is the inner annular edge 44 of the rolling diaphragm generally indicated by the numeral 45. The outer periphery 46 of the diaphragm 45 is clamped between the clamping flanges 30 and 31. The diaphragm 45 is retained on the support member 43 by means of the inner guide generally indicated by the numeral 47. The inner guide 47 includes the end wall 48 through which is formed an axial opening for the sliding reception of the upper valve stem portion 28. The guide 47 further includes the integral vertically extended annular flange 49 which is formed on the outer edge of the guide bottom end wall 48. The outer surface of the flange 49 functions as a guide for the rolling diaphragm 45 during operation of the valve. The inner guide 47 is secured against the diaphragm support 43 by means of a suitable retainer 50 which may be of any suitable type, as for example, a conventional C-shaped clip ring, a wave washer or the like. The retainer 50 may also be a nut. A spring 51 is mounted around the upper end of the valve stem portion 28 and the lower end thereof is seated within the guide flange 49 and abuts the wall 48. The upper end of the spring 51 surrounds the boss 41 and is seated against the inner side of the cap end wall 38. The inlet housing cap 32 is provided with the orifice 52 which is formed through the cap end wall 38 and which functions to exhaust the interior of the end cap to the atmosphere. The spring 51 is adapted to normally move the valve and stem assembly 27 to the closed position to seat the valve element 42 on the valve seat 20.

The lower portion of the valve and stem assembly 27 is indicated by the numeral 53 and the upper end thereof is reduced as indicated by the numeral 55 and is adapted to be seated in the recess 54 formed in the lower end of the upper valve stem portion 28. The lower valve stem reduced end 55 may be threadably engaged in the recess 54. The valve stem portions 53 and 28 may also be secured together by other suitable means, as for example, by being bonded together with a cement or adhesive.

A rolling diaphragm support member 56 is formed on the lower valve stem member 53 at a suitable distance apart from the valve element 42. The diaphragm support members 43 and 56 are identical insofar as their working surface configuration areas are concerned. The lower valve stem portion 53 extends downwardly and out through the open end 57 of the outlet housing 11. The lower end of the outlet housing 11 is provided with the outwardly extended horizontal clamping flange 58 which is adapted to have seated thereon the mating clamping flange 59 of the outlet lower end cap which is generally indicated by the numeral 60. The flanges 58 and 59 are releasably secured together by means of the clamping ring 61 which is formed identical to the upper end cap clamping ring 33. As shown in FIG. 1, the clamping ring 61 is provided with the two ends 62 and 63 which are releasably secured together by means of the bolt 64 and the nut 65. The lower end cap 60 is provided with the lower end wall 66 through which is formed the bore 67 for the slidable reception of the lower end of the valve stem portion 53. A journal or guide means is provided for the lower end of the valve stem portion 53 by means of the outwardly extended hub 68 and the inwardly extended boss 69 which are formed on the lower cap end wall 66 around the bore 67. The upper end cap 32 and the lower end cap 60 may be identically formed as shown in the drawing.

The lower valve stem portion 53 is provided with a rolling diaphragm generally indicated by the numeral 70 which is identical in structure to the upper rolling diaphragm 45. The outer periphery 71 of the diaphragm 70 is fixedly secured between the clamping flanges 58 and 59. The inner periphery 72 of the diaphragm 70 is fixedly secured between the lower surface of the support member 56 and the upper end wall 73 of the guide member 74. The guide member 74 is identical to the upper inner guide member 47 and is provided with the outer vertical downwardly extended integral annular flange 75 which forms a guide means for the rolling diaphragm 70. The guide member 74 is secured against the support member 56 by any suitable means as by means of the retainer 76 which may be in the form of a C-shaped retainer ring, a wave washer or the like. The retainer 76 may also be a nut. It will be understood that the diaphragm sealing surfaces between the clamping flanges, and the support members and the guides, may be provided with any suitable seating surfaces, such as beads and the like. Also the clamping flanges 30, 31, 58 and 59 may be of any suitable design and be secured by other means, as for example, by screws, a bayonet type joint, or the like. The outlet housing cap 60 is provided with the orifice 106 which is formed through the cap end wall 66 and which functions to exhaust the interior of the end cap to the atmosphere.

FIGS. 1, 2 and 3 show a manual means for operating the valve. Numeral 77 generally indicates a mounting bracket having a vertical leg 78 fixedly secured to the projection 79 which is formed on the outer side of the inlet housing 10 by means of the screw 80. The mounting bracket 77 further includes the integral horizontal plate 81 which is provided with a suitable hole so as to mount the plate 81 around the threaded hub 39 on the upper end cap 32. The mounting bracket plate 81 is fixedly secured in place by means of the lock nut 82 which is threaded on the cap hub 39.

As best seen in FIG. 4, the upper outer end of the valve stem portion 28 is reduced and is provided with the horizontally disposed hole 83. A pin 84 is mounted through the hole 83 and is adapted to secure the clevis 85, and the inner end of the control lever 86, to the valve stem portion 28. The pin 84 is secured in place by means of the clip ring or retainer 87. The retainer 87 may also be a cotter pin or other suitable retainer means. Secured to the clevis 85 is a control cable 88, to the outer end of which is fixedly connected a manual control ring 89. The control lever 86 is pivotally mounted by means of the pin 90 to the flange 91 which is integrally formed on the upwardly extended arm 92. The arm 92 is formed on the outer end of the plate 81. The upper end of the arm 92 is folded downwardly and horizontally to form the flange 93. Threaded through the flange 93 is the flow control screw 94 which is adapted to be locked in place by the lock-nut 95. By adjusting the screw 94 upwardly and downwardly, the stroke of the valve and stem assembly 27 may be regulated.

In operation, the control cable 88 is routed over suitable pulleys to a remote location. The valve may be operated from such remote location by pulling the cable until it stops and placing the pull ring 89 over a suitable hook or projection to maintain it in the extended position so as to hold the valve in the open position. A stiff extension spring may be inter-connected in the cable 88 so that there is some give in the cable 88 to permit it to be easily hooked into the extended open position.

When the valve and stem assembly 27 is moved upwardly from the closed position shown in FIG. 2, to the open position shown in FIG. 4, the valve element 42 will be raised from the valve seat 20 and fluid under pressure will be allowed to flow from the inlet housing 10 down through the entrance opening 19 into the outlet housing 11 and thence out through the outlet tube 14.

As the valve element 42 is raised from the seat 20, the valve seating spring 51 is compressed and the upper rolling diaphragm 45 rolls off of the inner guide 47 and onto the interior wall surface of the end cover 32 until a position similar to FIG. 4 is reached. The lower rolling diaphragm 70 simultaneously rolls in an opposite manner in that it rolls off of the interior wall surface of the lower end cover 60.

Due to the rolling action of the diaphragms 45 and 70, and their constant effective operating areas, the valve is in a balanced condition between the upper side area of the valve element 42 and the equal effective area of the diaphragm 45, and between the lower side area of the valve element 42 and the equal effective area of the diaphragm 70. However, the lower side area of the valve element 42 is reduced by a small amount when it is in the closed position, and this area differential assists in the seating action of the valve element 42. This differential in operating area during the closing action has no effect on the type or stiffness of the spring 51 because at the instant of opening the valve, the pressure on the valve is fully balanced and remains so through its opening period and flow cycle.

FIG. 5 shows an electrical solenoid means for operating the valve. The solenoid means includes a conventional solenoid, generally indicated by the numeral 96, which is fixedly secured by any suitable means to the leg 78 of the bracket 77. The solenoid 96 includes the usual solenoid armature rod 97 which is connected by means of the pin 98 to the outer end of the control lever 86. It will be seen that when the solenoid 96 is energized, the armature rod 97 will be moved downwardly so as to pivot the control lever 86 about the pin 90 to the dotted line position indicated by the number 99, to move the valve and stem assembly 27 upwardly to the open position. The solenoid 96 would be connected to any suitable source of electrical power and may be operated by a manual switch or by a conventional time clock. The solenoid 96 may be of any suitable type so as to operate on available conventional voltages. It will be understood that various lengths of control levers 86 may be used so as to make it possible to adapt the valve to fit any desired design conditions.

FIG. 6 shows a first method for connecting the inlet tube 12 to an unthreaded inlet pipe as 100, by means of a suitable O-ring sealing means 101 and a suitable cement or adhesive 102.

FIGS. 7 and 8 illustrate a second method for connecting an unthreaded pipe as 103 to the inlet tube 12. As shown in FIGS. 7 and 8, the unthreaded pipe 103 is mounted in the tube 12 and secured in place by means of the wire clamp 104 and a suitable O-ring sealing means 105. The wire clamp 104 may be of any suitable type. The wire clamp 104 provides a clamping action on the pipe 103 by deforming the reduced thickness outer end of the inlet tube 12. The deforming action in turn deforms the O-ring sealing means 105 and creates a sealing action of great holding power.

FIGS. 9, 10 and 11 illustrate a second embodiment of the invention. The valve illustrated in FIGS. 9 through 11 is substantially the same as the valve of the first embodiment illustrated in FIGS. 1 through 4 with the exception that the rolling diaphragms 45 and 70 are provided with a slightly different peripheral retainer configuration. Another difference is that the valve inlet and outlet housings are made as a unitary part. Since the valve structure of FIGS. 9–11 is the same as that of FIGS. 1–4 with the exception of the aforementioned differences, the valve parts which are identical with the valve parts of FIGS. 1–4 are marked with corresponding reference numerals followed by a small letter a.

As shown in FIG. 10, the outer periphery of the rolling diaphragm 45a is provided with a circular bead 107 which is held in sealing engagement between the annular, inwardly extended flanges 108 and 109. The diaphragm engaging flange 108 extends inwardly from the inner surface of the wall of the inlet housing 10a and is integral therewith. The diaphragm clamping flange 109 extends downwardly from the inner end of the inlet housing cap flange 31a and is integral therewith.

The lower rolling diaphragm 70a is provided with a similar peripheral mounting bead 110 which is clamped between the annular, inwardly extended flanges 111 and 112. The flange 11 is integrally formed with and extends inwardly from the lower end of the inner wall surface of the lower outlet housing 11a. The clamping flange 112 is integrally formed with and extends upwardly from the inner end of the clamping flange 59a formed on the lower outlet housing end cap 68a.

This second embodiment does not have the universal annular adjustable relationship between the input and output tubes 12a and 14a as is provided in the first embodiment wherein the upper inlet housing 10 and lower outlet housing 11 are rotatably adjustable relative to each other. This second embodiment functions in the same manner as the aforedescribed first embodiment of FIGS. 1 through 4.

FIG. 12 illustrates an electric solenoid means for operating the valve illustrated in FIGS. 9 through 11. The solenoid means includes a conventional solenoid generally indicated by the numeral 96a. It is identical to the solenoid 96 illustrated in FIG. 5. The supporting structure for the solenoid 96a and the operating levers therefor are the same as for the solenoid 96 illustrated in FIG. 5, and the identical parts have been marked with corresponding reference numerals followed by the small letter a. The solenoid 96a may be connected to any suitable source of electrical power and may be operated by a manual switch or by a conventional time clock. Solenoid 96a may be of any suitable type so as to operate on available conventional voltages. It will be understood that various types of control levers 86a may be used so as to make it possible to adapt the valve to fit any desired design conditions. The second embodiment of FIGS. 9–11 may also be provided with the attachment methods shown in FIGS. 6, 7 and 8 for connecting an unthreaded inlet pipe to the inlet tube 12a.

Most prior art valves have small ports for hydraulic pilot operation of the valves and they are subject to plugging by hard water deposits. Other prior art valves which have a close fitting piston action are also adversely affected by the same type of deposits on the cylinder walls. These deposits usually develop over a prolonged period of non-use, such as during the winter periods. For the piston type valve there is also the possibility of rust and dirt particles lodging between the piston and cylinder wall and binding the piston. The valve of the present invention overcomes the aforementioned disadvantages because the rolling diaphragm precludes the necessity for close tolerances, and its rolling action in the opening and closing cycles would tend to flake off any hard water deposits before they could build up.

While it will be apparent that the preferred embodiments of the invention herein disclosed are well calculated to fulfill the above stated objects, it will be appreciated that the invention is susceptible to modification, variation and change without departing from the proper scope or fair meaning of the subjoined claims.

What I claim is:

1. A balanced fluid flow control valve comprising: an outlet housing having an open lower end and an outlet port; an inlet housing having an open upper end and an inlet port; said inlet housing being disposed in vertical alignment on the outlet housing; an integral wall on the upper end of the outlet housing between said inlet and outlet housings having a flow passage opening formed therethrough with a valve seat formed therearound in said inlet housing; a stem movably mounted in said housings and having the lower end thereof extended through said opening into said outlet housing and out of said open lower end; a valve on said stem in said inlet housing normally seated on said valve seat for closing said opening and blocking the flow of fluid therethrough; said stem extending upwardly from said valve and through the open upper end of the inlet housing; an upper end cap mounted on the upper end of said inlet housing for enclosing the open upper end; a lower end cap mounted on the lower end of the outlet housing for enclosing the lower open end of the same; clamping means for securing said end caps on said housings; spring means in said upper end cap and engaged with the upper end of said stem for biasing the same downwardly to move said valve into closing engagement with said valve seat; a first rolling diaphragm having the periphery sealingly secured to the upper end of said inlet housing and a central portion sealingly secured to the valve stem; a second rolling diaphragm having the periphery thereof sealingly secured to the lower end of said outlet housing and a central portion sealingly secured to the valve stem; the effective operating areas of said rolling diaphragms and said valve being substantially equal; and, means for moving said stem and valve upwardly against the action of said spring means for opening the valve to permit fluid flow from said inlet housing into said outlet housing for discharge through said outlet port.

2. A balanced fluid flow control valve as defined in claim 1, wherein: said inlet and outlet housings are separately formed and are releasably clamped together whereby they may be rotatably adjusted relative to each other.

3. A balanced fluid flow control valve as defined in claim 1, wherein: the peripheries of said rolling diaphragms are secured to the housings by having said peripheries clamped between the ends of the housings and the respective end caps.

4. A balanced fluid flow control valve as defined in claimed 1, wherein: the peripheries of said rolling diaphragms are provided with a bead which is clamped between members formed on the respective housing and adjacent end cap.

5. A balanced fluid flow control valve as defined in claim 1, wherein: said means for moving said stem and valve upwardly against the action of said spring means comprises a manually operated means.

6. A balanced fluid flow control valve as defined in claim 1, wherein: said means for moving said stem and valve upwardly against the action of said spring means comprises a solenoid operated means.

7. A balanced fluid flow control valve as defined in claim 1, wherein: said inlet and outlet ports are provided with an inlet tube which may be connected to an unthreaded pipe by an O-ring sealing means and an adhesive means.

8. A balanced fluid flow control valve as defined in claim 1, wherein: said inlet and outlet ports are connected to unthreaded pipes by means of tubes and an O-ring sealing means and a clamp means.

9. A balanced fluid flow control valve as defined in claim 1, wherein: said inlet and outlet ports are threaded for connection to threaded inlet and outlet pipes.

References Cited by the Examiner

UNITED STATES PATENTS

| | | | |
|---|---|---|---|
| 1,296,410 | 3/1919 | Levinsen | 137—608 XR |
| 1,481,663 | 1/1924 | Davis | 251—367 XR |
| 1,937,865 | 3/1932 | Baker | 285—111 |
| 2,481,214 | 9/1949 | Harper | 251—367 X |
| 2,524,562 | 10/1950 | Dawbarn | 285—252 XR |
| 2,826,215 | 3/1958 | Wolfslau et al. | 137—454.6 |
| 2,844,352 | 7/1958 | Dahl | 251—367 XR |
| 2,931,616 | 4/1960 | White et al. | 251—282 XR |
| 3,084,901 | 4/1963 | Thorburn | 251—282 XR |
| 3,087,705 | 4/1963 | Hamilton | 251—282 XR |
| 3,121,440 | 2/1964 | Heller | 251—282 XR |
| 3,185,178 | 5/1965 | Bonnard | 251—367 XR |

M. CARY NELSON, *Primary Examiner.*

S. SCOTT, *Assistant Examiner.*